United States Patent [19]
Abbey, III et al.

[11] Patent Number: 5,148,960
[45] Date of Patent: Sep. 22, 1992

[54] ROTARY SEAM GUIDE

[75] Inventors: Nelson D. Abbey, III, Monclova; Timothy J. Lewandowski, Swanton, both of Ohio

[73] Assignee: Abbey Etna Machine Company, Perrysburg, Ohio

[21] Appl. No.: 830,066

[22] Filed: Feb. 3, 1992

[51] Int. Cl.$^5$ ............................................. B23K 13/02
[52] U.S. Cl. ........................... 228/17.5; 228/18; 228/44.3; 72/206; 72/248; 72/250
[58] Field of Search ............... 228/147, 148, 173.7, 228/5.1, 17.5, 18, 44.3; 72/206, 248, 250; 219/61.3

[56] References Cited

U.S. PATENT DOCUMENTS 3,487,707  1/1970  Kortan ............................ 72/248
4,709,845 12/1987  Akiyama et al. ............. 228/17.5

FOREIGN PATENT DOCUMENTS 2141311  4/1972  Fed. Rep. of Germany ..... 228/17.5
232925   1/1974  U.S.S.R. ......................... 228/17.5

Primary Examiner—Samuel M. Heinrich
Attorney, Agent, or Firm—Marshall & Melhorn

[57] ABSTRACT

The invention comprises an apparatus for aligning and guiding the seam of newly formed tube as it enters the welding mechanism in the manufacture of continuous seam-welded metal tubes or pipes. A rotary seam guide member having an alignment fin is mounted so that a alignment fin rollingly engages within the open seam immediately in advance of the seam welding mechanism. The seam guide member and a cooperating opposed roller guide the tube into the welding mechanism. The seam guide and opposed roller are carried within a roll stand including mechanism by which their position may be adjusted vertically and longitudinally relative to the welding mechanism, as well as rotated arcuately about the path of the tube. The seam guide member and/or the opposed roller may include insulating barriers to impede induced heating thereof.

11 Claims, 4 Drawing Sheets

ROTARY SEAM GUIDE

BACKGROUND OF THE INVENTION

1. Field of the Invention

The present invention relates generally to the manufacture of continuous seam-welded metal tubes or pipes, and more particularly to a novel apparatus for aligning and guiding the seam of the newly formed tube or pipe with the welding and fusing mechanism.

2. Description of the Prior Art

In accordance with a well-known process for producing seam-welded pipes and tubes, a continuous strip or skelp is advanced through forming apparatus and progressively deformed into a tubular form having an open, longitudinally extending seam. The tubular form then advances through a welding station wherein the adjacent longitudinal edges are urged together and joined by a suitable welding process. The particular welding process employed will generally be dictated by the material from which the tube or pipe is formed, for example, low carbon steel, stainless steel, aluminum, etc., and may include any of the well-known welding techniques conventionally employed with the different materials. In a preferred embodiment the tube or pipe is heated by electrical induction so that the edges achieve fusion temperature, and the heated edges are urged together to produce a continuous monolithic weld of the seams.

As the strip or skelp is deformed the resulting tubular member has a tendency to twist or snake as it advances through the apparatus. In order to produce an acceptable product, it is important that the seam weld be of consistent high quality, and in order to achieve such consistency the seam must be properly aligned as it enters the welding apparatus. Despite the best efforts in the prior art to maintain alignment of the seam, the devices employed heretofore have not been able to accommodate the twisting and snaking of the tubular member and have not proven entirely satisfactory. The equipment employed heretofore has not been capable of being readily adjusted on the fly to correct for deviations of the newly formed tube so as to permit continuous production for extended periods of time. The equipment heretofore available has lacked the capability to quickly and readily adapt to changing conditions while permitting continuous operation of the tube forming apparatus.

SUMMARY OF THE INVENTION

In accordance with the present invention, the aforementioned deficiencies of the prior art devices are overcome by providing a seam guide capable of adjustment in response to deviation of the seam of the advancing tube from a desired position and to maintain proper alignment and positioning of the seam relative to the seam welder. A rotary seam guide member provided with an alignment fin is mounted so that the alignment fin rollingly engages within the open seam immediately in advance of the seam welding mechanism. The seam guide member and a cooperating opposed roller guide the tube into the welding mechanism. The rotary seam guide and opposed roller are carried within a roll stand including mechanism by which their position may be readily adjusted vertically, and, longitudinally relative to the stationary welding mechanism, as well as rotated about the longitudinal axis of the tube path. The mechanism may thus be adjusted as production continues to precisely guide the seam into the welding mechanism so as to compensate for variations in the tube forming process and permit uninterrupted operation of the facility.

BRIEF DESCRIPTION OF THE DRAWINGS

In the drawings, wherein like numerals are employed to designate like parts throughout the same.

DESCRIPTION OF THE PREFERRED EMBODIMENT

Figure 1:
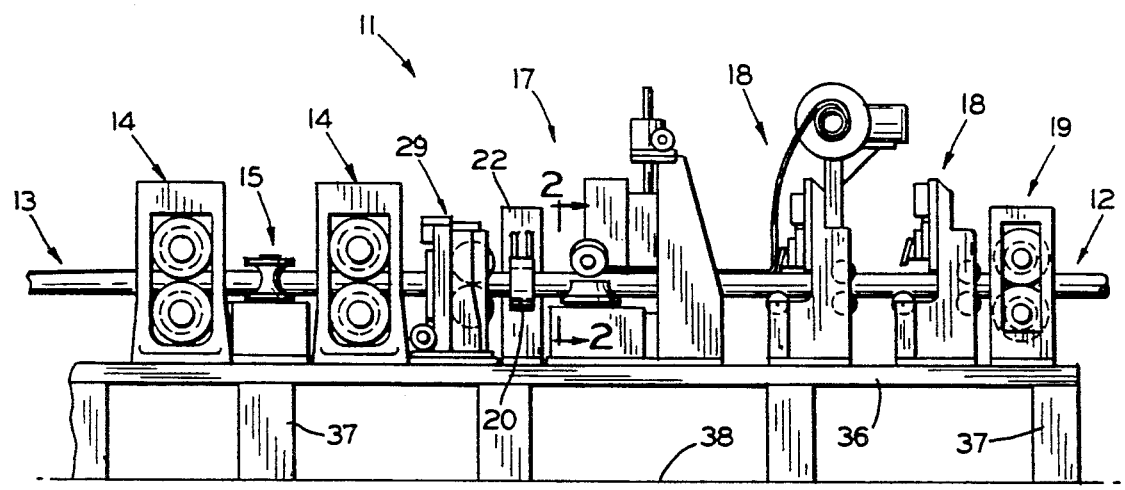
FIG. 1 is a schematic side elevational view of a portion of a line for producing continuous seam welded pipe or tubing and embodying the invention.

There is shown schematically at 10 in FIG. 1 a portion of a conventional tube forming mill for the continuous production of cylindrical seam welded metal tubing 11. In such mills a metal strip or skelp 12 is continuously withdrawn from a supply (not shown) and advanced through a series of opposed forming rolls 13 and side closing rolls 14 whereby it is progressively bent into tubular form. The formed blank then advances through a welding station 17 wherein the seam is suitably welded to produce a continuous seam welded tube. The tube may then pass through a scarfing unit 15 for removal of the raised bead formed incident to the welding of the seam. In the illustrated embodiment, two of the scarfing units are located in tandem along the production line to permit alternate use of the units so that one may be serviced while the other is in operation. Thereafter, the tube may be advanced through additional traction and working roll units 19 (only one shown) for final working prior to being cut into units of desired length or otherwise prepared for shipment to customers.

Figure 2:
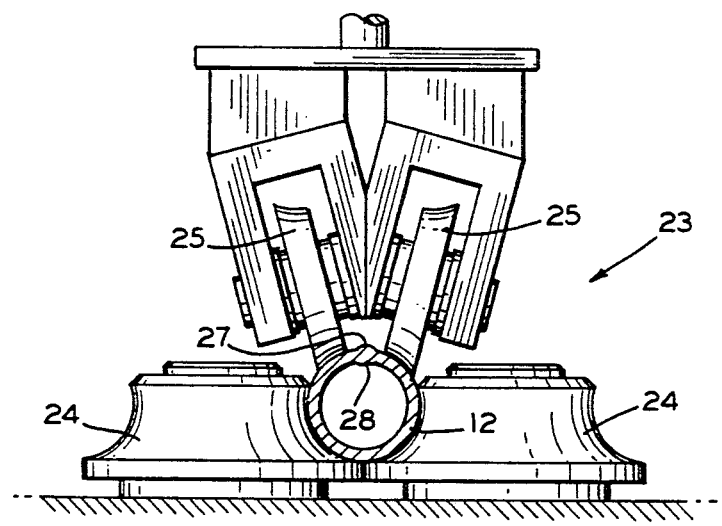
FIG. 2 is an enlarged elevational view taken substantially along line 2—2 of FIG. 1.
Figure 3:
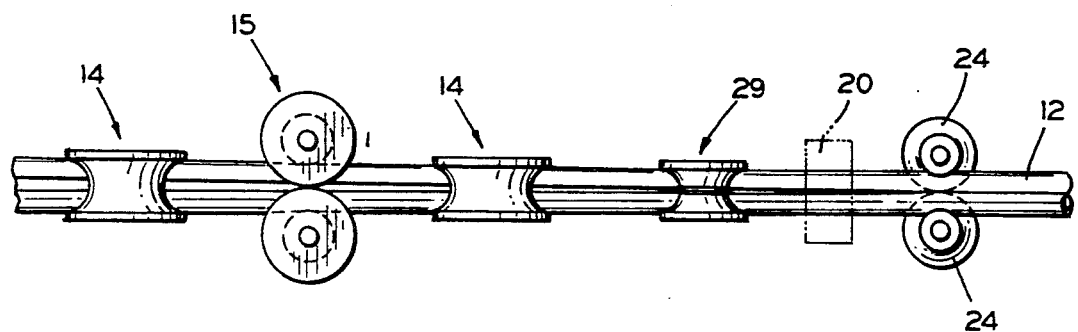
FIG. 3 is a schematic top plan view of the seam guide and welding section area of the device.

As heretofore indicated, it is contemplated that the seam of the tube may be welded by any of the well-known processes suitable for the particular material from which the tube is formed. In any event it is imperative that the seam be precisely aligned and positioned as it enters the welding equipment in order to consistently produce a weld of high quality. In accordance with a preferred embodiment as illustrated in FIGS. 1 and 2, the tube is heated by induction and the facing edges of the tube are urged against one another while the material is at a sufficiently high temperature to cause them to fuse together. To that end, at the welding station as will be seen in FIG. 1, the formed tube passes through an induction coil 20 of an induction heating unit 22. The heated tube thereafter immediately enters a roller press 23 where it passes between opposed side rolls 24 and beneath angularly disposed press rolls 25 which urge the edges of the confined tube together. As a result of the temperature of the tube material and the pressure applied by the rolls 24 and 25, the edges of the formed tube fuse at their interface, and the material bulges along the seam to create raised outer and inner beads 27 and 28 (FIG. 2). Immediately following welding and formation of the beads, and while remaining at nearly the fusion temperature, the tube enters the scarfing unit 18 for removal of at least the outer bead 27.

Figure 4:
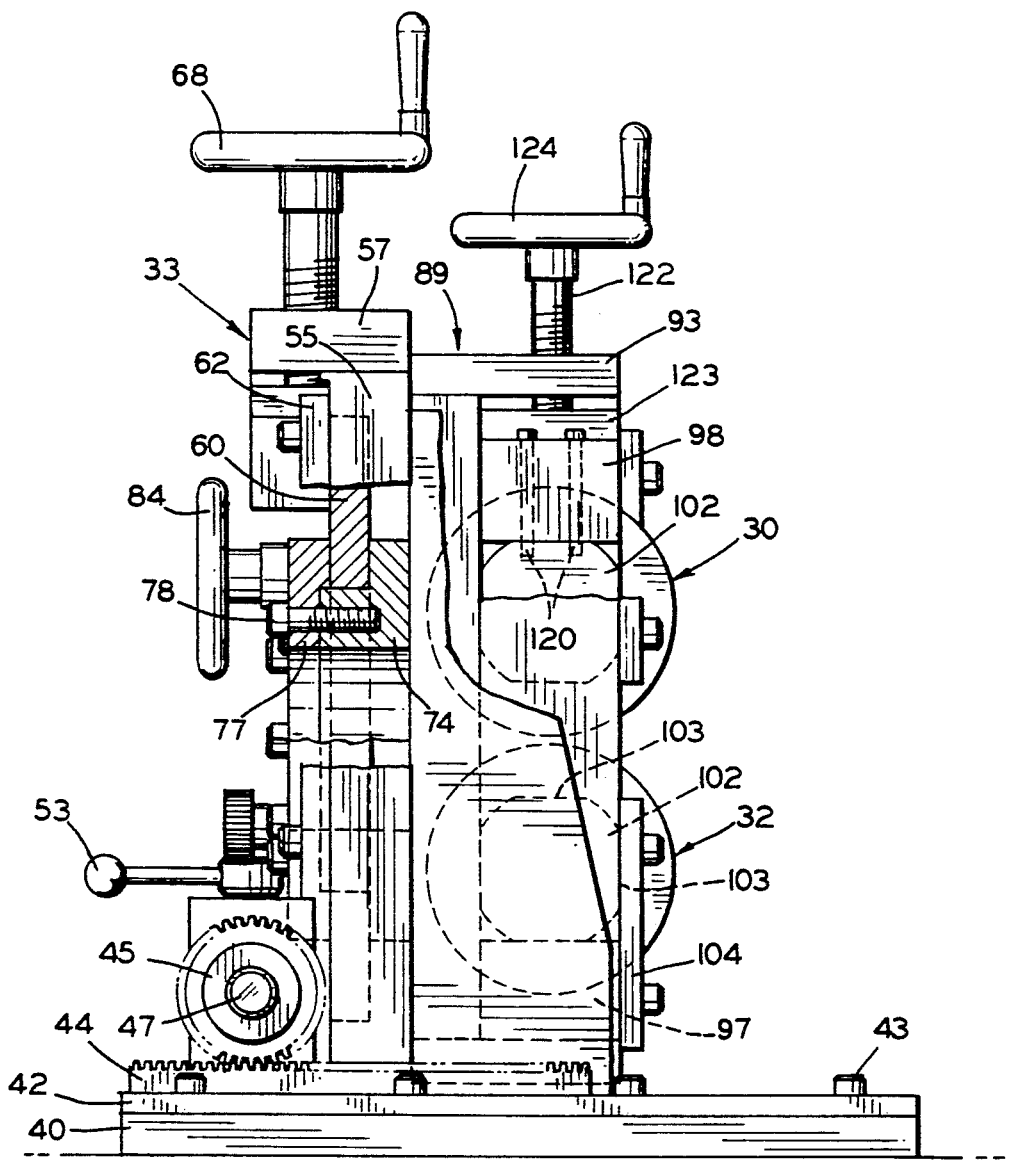
FIG. 4 is an enlarged side elevational view, partially in section, of the novel seam guide assembly.

As indicated above, in order to consistently produce a welded seam of high quality, the seam must be accurately positioned as it enters the roller press 23, and it must be capable of being maintained in this position despite changing conditions in fabrication of the tube tending to cause displacement of the seam. To that end, there is provided immediately in advance of the welding station 17 a rotary seam guide unit, identified generally at 29. As will be seen in FIG. 4, the seam guide unit includes cooperating, opposed upper and lower rolls 30 and 32, respectively, mounted within an adjustable carriage mechanism 33. The rolls 30 and 32 are formed with curved circumferential peripheral surfaces 34 and 35, respectively, adapted to define a passageway corresponding to the configuration of the outer surface of the tube and to receive the advancing tube for guiding it along a precise path for passage through the adjacent welding station 17.

As illustrated in FIG. 1, the components of the tube forming mill 11 are mounted upon a platform 36 carried by pedestals 37 supported as upon the floor 38 of a factory building. The adjustable carriage mechanism 33 within which the rolls 30 and 32 are mounted incorporates mechanism for selectively moving the roll 30 toward and away from the roll 32, and for moving the two rolls as a unit vertically, longitudinally along the path of the tube 12, and angularly about the longitudinal axis of the tube. To that end, the carriage mechanism 33 is mounted upon a base plate 39 carried upon the platform 36 so as to be longitudinally adjustable therealong. More particularly, the base plate slidably rests upon platform 36 between longitudinal guide bars 40 along either side thereof. Retainer plates 42, affixed to the platform as by studs 43 and extending through the plates and into the platform, extend over the longitudinal edges of the base plate to define, with the opposite guide bar and the platform, a longitudinal slideway for the base plate.

Figure 8:
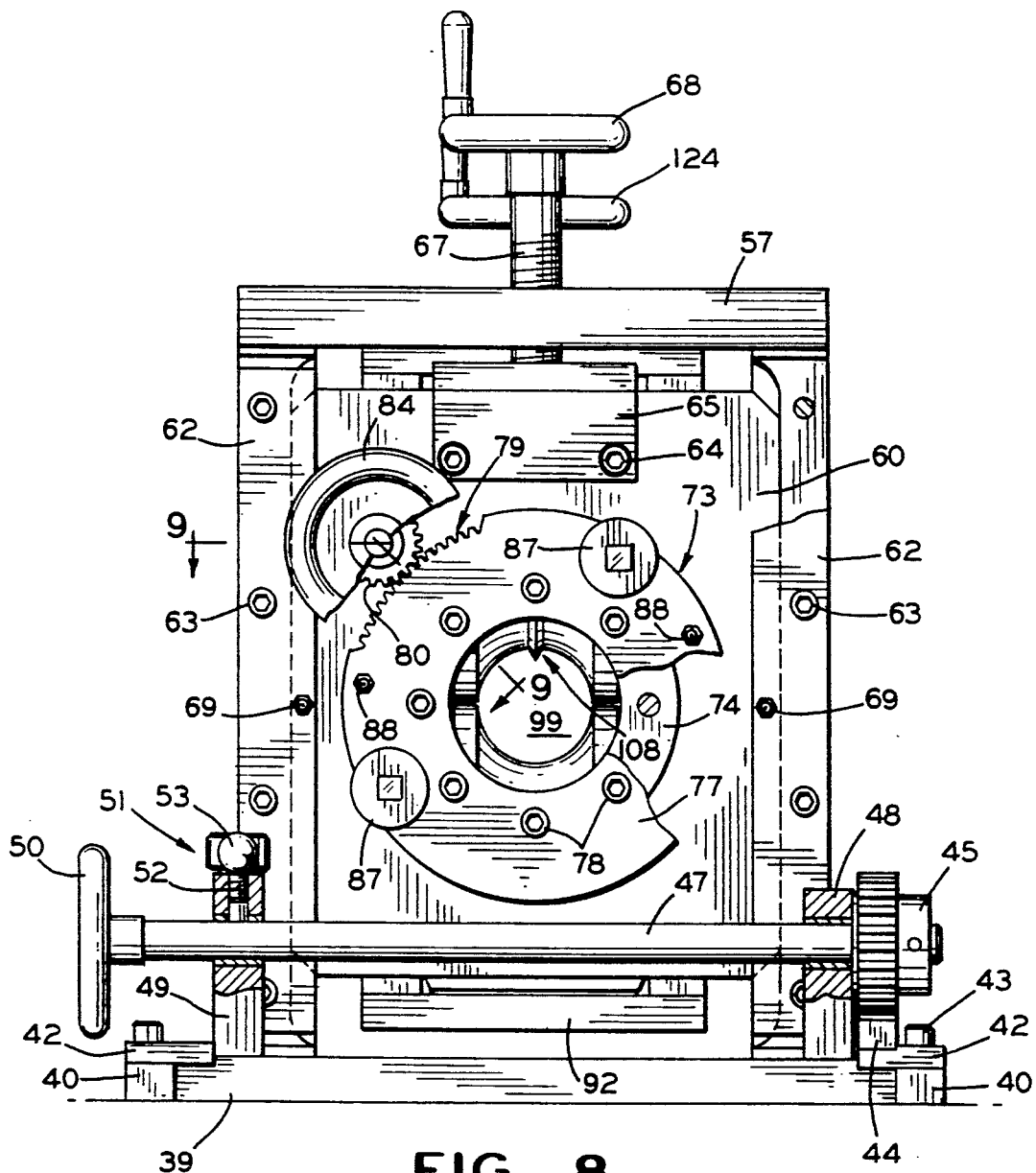
FIG. 8 is an end elevation as viewed from the left in FIG. 4, with parts broken away.

In order to move the base plate to and secure it in selected positions along the slideway, there is affixed to one of the retainer plates an elongated rack member 44. The teeth of a pinion gear 45 affixed to a shaft 47 drivingly engage the teeth of the rack. The shaft is journalled at the end carrying the pinion gear in a bushing within a bearing bracket 48 affixed to the base plate 39. At the opposite side of the carriage mechanism the shaft is journalled in a bearing post 49 likewise affixed to the base plate. A hand wheel 49 is provided for manually turning the shaft 47, and thus the pinion gear 45 in driving engagement with the rack member, to thereby move the base plate 39 to selected longitudinal positions along the slideway between the guide bars 40. In order to secure the base plate in the selected position, there is provided a clamping device, identified generally at 50, and including a threaded brake member 52 rotatably threaded through the top portion of the bearing post as best seen in FIG. 8. A lever 53 is provided at the upper end for rotating the brake member. The brake member can thus be selectively advanced so that its lower end is brought into frictional engagement with the outer surface of the shaft 47 to prevent rotation thereof, or retracted to permit free rotation of the shaft.

Figure 7:
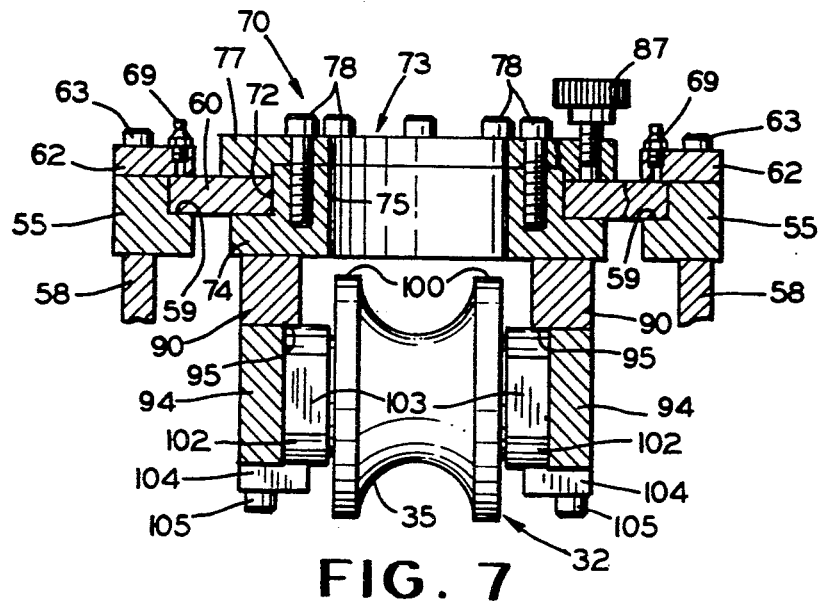
FIG. 7 is a sectional view taken substantially along line 7—7 of FIG. 6.

There is affixed to the base plate 39 an upstanding framework, shown generally at 54, within which the roller press chain 33 is suspended. More particularly, the framework comprises a spaced pair of columns 55 affixed at their lower ends to the base plate and interconnected at their upper ends by a cross member 57. A gusset plate 58 extending upwardly along one face of each column is affixed to the column and the base plate for strengthening and rigidifying the framework. As best seen in FIGS. 7 and 8, oppositely disposed corner portions of the columns 55 are removed to define recesses 59 extending longitudinally along the columns. A carrier plate 60 is received within the recesses and retained therein by side plates 62 removably secured to the columns as by threaded fastener 63. The recesses 59 and side plates 62 thus define channels within which the marginal edges of the carrier plate are confined so that the carrier plate may be moved up or down along a vertical path.

In order to provide for moving the plate to and retaining it in selected vertical positions, there is affixed to the upper marginal portion of the plate as by fasteners 64, a connecting bracket 65. An adjusting screw 67 threadedly extends through the cross member 57 and is rotatably coupled at its lower end to the connecting bracket. A hand wheel 68 is provided at the opposite end of the adjusting screw, and grease fittings 69 may be provided on the side plates for admitting lubricant and facilitate movement of the marginal edges of the carrier plate 60 within the channels. Thus, by appropriately turning the hand wheel 68 the carrier plate 60 can be moved to selected vertical positions within the upstanding framework 54.

A frame assembly identified generally at 70, is affixed to the carrier plate 60 for carrying the upper and lower rolls 30 and 32, respectively. More particularly, as will best be seen in FIGS. 7 and 8, the carrier plate 60 is formed with a circular control opening 70 defined by an annular wall 72. The cooperating rolls 30 and 32 are mounted so that their axes of rotation can be angularly displaced or rotated about the longitudinal axis of the tube passing therebetween to properly align the seam with the induction heating unit 22 and the press rolls 23 as will be hereinafter described. To that end, there is affixed to the carrier plate 60 a rotary bracket 73 comprising a mounting plate 74 engaging one surface of the carrier plate and having an annular flange 75 extending through the opening and abutting the annular wall 72. A retainer ring 77 disposed adjacent the opposite surface of the carrier plate abuts the extending end of the annular flange and is affixed thereto as by threaded fastener 78.

Figure 9:
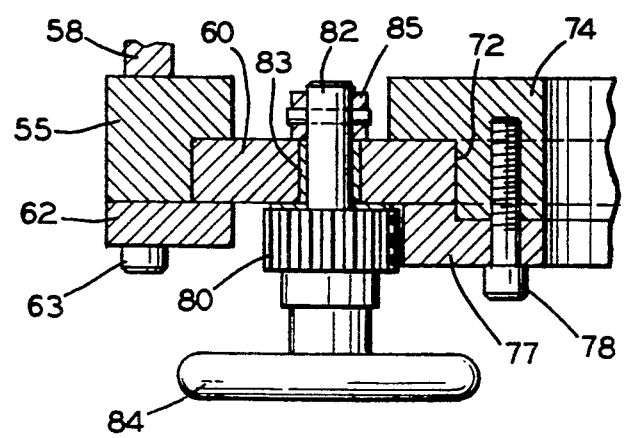
FIG. 9 is a sectional view taken substantially along line 9—9 of FIG. 8.

As will be readily apparent, the rotary bracket 73 may thus be rotated relative to the carrier plate. In order to manually adjust the bracket and thus the rolls 30 and 32 carried thereby to selected angular positions and to secure the fitting in the selected position, the outer peripheral wall of the retaining ring 77 is provided with a teethed arcuate segment 79 (FIGS. 8 and 9). A similarly toothed spor gear 80 drivingly engages the arcuate segment. The spur gear is affixed to a shaft 82 extending through a bushing 83 within the carrier plate 60. A hand wheel 84 is affixed to one end at the shaft and the shaft is secured against endwise movement by a suitable fastener 85 at the opposite end. Thus, by turning the hand wheel 84 the rotary bracket 73 may be rotated within limits defined by the extent of the arcuate segment 79, typically an arc on the order of 8 to 10 degrees. In order to secure the rotary bracket at selected positions, one or more rotary clamping devices 87 may be threaded through the retaining ring whereby when manually tightened down the forward end of the device will frictionally engage the carrier plate. Grease fittings 88 may be provided on the mounting plate 74 for lubricating the surfaces to facilitate rotation of the bracket 73.

There is carried by the mounting plate 74 a box frame, identified generally at 89, and comprising a pair of upright side members 90 affixed to the mounting plate and interconnected by a base member 92 at their lower ends and a cross bar 93 at their upper ends. As best seen in FIG. 7, side plates 94 somewhat narrower than the members 90 are affixed to the members 90 so as to define rear ledges 95 extending along the side members 90 from the base member to the cross bar. A U-shaped roll support 97 is removably received within the box frame so as to rest upon the base member 92 and abut the ledges 95 for supporting the lower roll 32 as will be described. A similarly U-shaped insert 98 is provided at the upper end of the box frame for carrying the upper roll 30.

Figure 6:
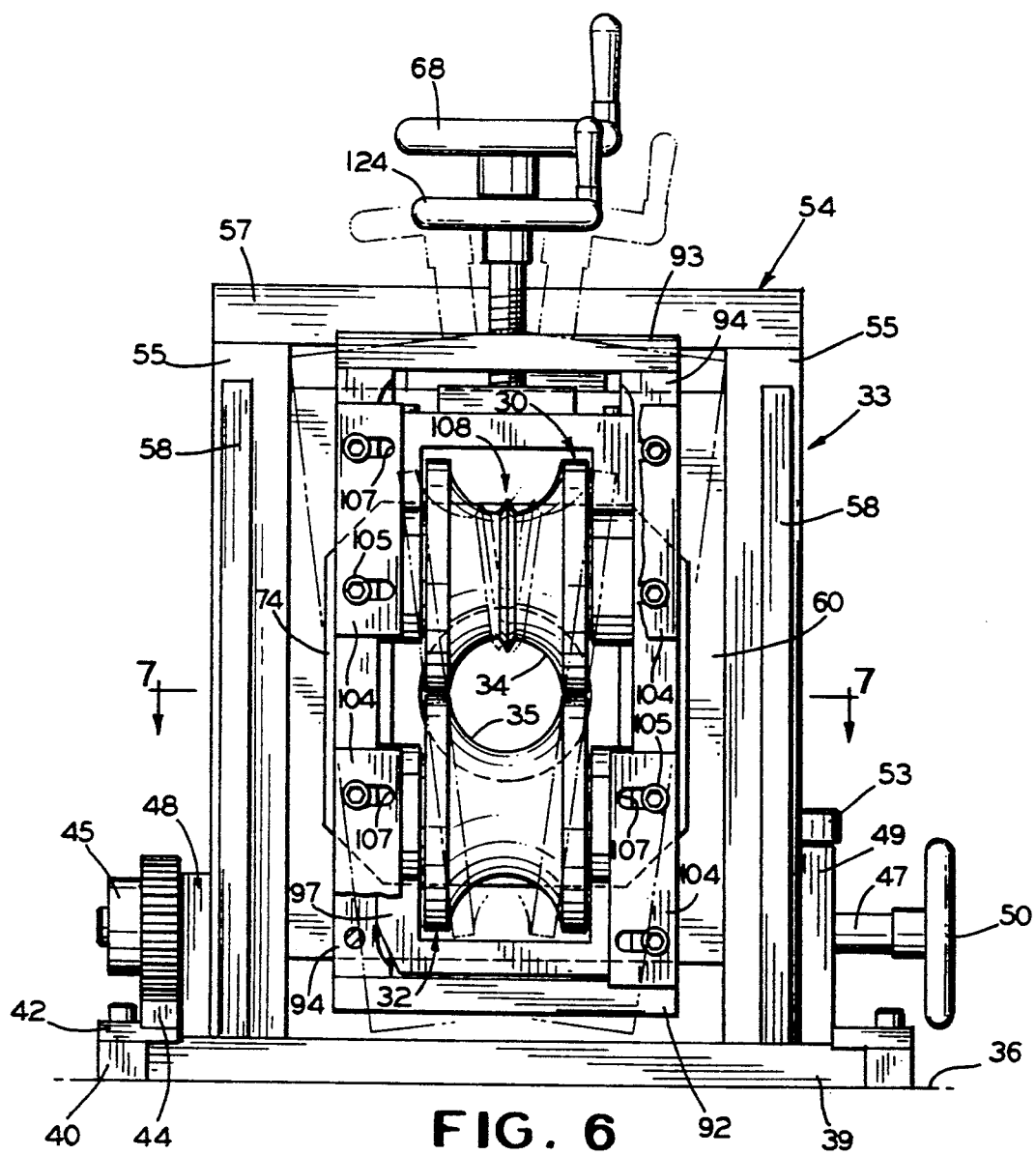
FIG. 6 is an end elevation of the rotary seam guide assembly as viewed from the right end in FIG. 4, with alternate rotational positions shown in broken lines.

As indicated above and as will be particularly apparent in FIGS. 6 and 8, the rolls 30 and 32 are formed with the curved peripheral surfaces 34 and 35, respectively, which cooperate in their operative positions to define a generally circular pass 99 therebetween for receiving the tube 12. The roll 32 further includes annular spacing shoulders 100 in either side of the curved portions 35 adapted to rollingly engage similar spacing shoulders 100 on the roll 30 for maintaining a minimum spatial relationship between the rolls. The roll is suitably journalled for rotation upon an axle in beating blocks 102 on either side. The bearing blocks are provided with oppositely disposed flat surfaces 103 and are so dimensioned as to be inserted between the side plates 94 and bear against the ledges 95. Retainer plates 104, secured as by stud belts 105 extending through transversely elongated slots 107 and threaded into the side plates 94, are adapted to bear against the adjacent flat surface 103 and retain the roll within the box frame 99. The roll can thus be readily changed by loosening the belt 104 and sliding the retaining plates 103 outwardly to permit removal and replacement of the roll assembly.

Figure 5:
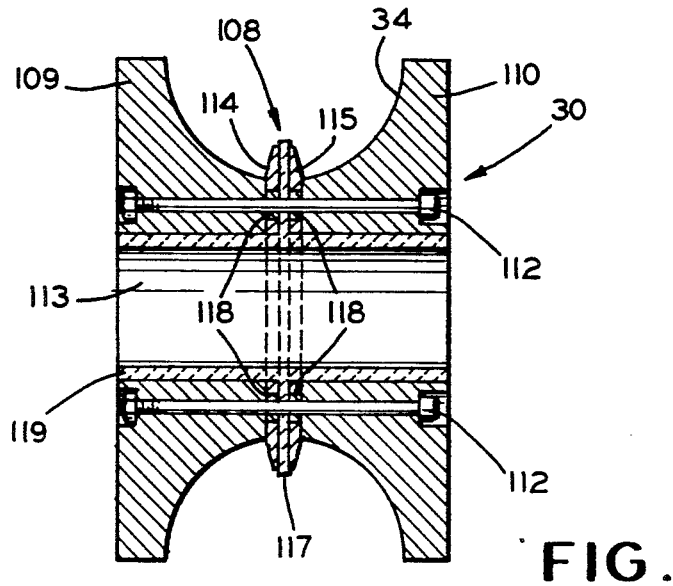
FIG. 5 is an enlarged transverse section of the rotary seam guide member.

The upper roll assembly is generally similar to that of the lower roll 32 except that the roll 30 is itself provided with a centrally disposed annular fin, identified generally at 108, extending outwardly for the curved surface 34 for rolling reception within the seam to guide the tube as it advances through the circular pass 99 between the rolls. The fin may, of course, be formed in various ways including being cast integrally with or machined as an extension of the roll surface. However, for purposes of extended service life and economy, in a preferred embodiment as best seen in FIG. 5 the roll is comprised of mating half sections 109 and 110 releasably secured together as by a plurality of threaded fasteners 112 disposed around the roll and extending therethrough. The opposite ends of the threaded fasteners may be recessed within the halt sections to avoid the presence of raised obstructions on the end surfaces of the roll. The assembled roll has a bore 113 extending axially therethrough for receiving the axle extending between the bearing blocks 102 by which the roll assembly is mounted within the U-shaped insert 98.

The annular fin may comprise a unitary washer-like member (not shown) of a suitable durable material interposed between the opposed surfaces of the roll half sections 109 and 110 and having a ridge of desired configuration extending outwardly around the curved surface 34. The washer-like member is clamped securely between the half sections by the fasteners 112 and may be readily removed or replaced as necessary.

In the illustrated embodiment, the rotary seam guide 29 is positioned closely adjacent the induction heating unit 22 of the welding station. Consequently, the roll 30 may be subject to undesirable heating by induction. In order to minimize such heating, the roll may be constructed with insulation barriers which impede the flow of induced current therein. Thus, as shown in FIG. 5, the annular fin is comprised of a pair of washer-like sections 114 and 115 having a spacer member 117 formed of suitable electrically insulating material therebetween. The assembly defines an annular extension of a suitable tapered configuration encircling the roll. Insulating washers 118 isolate the fasteners 112 from the sections 114 and 115, and an insulating bushing 119 is provided within the axial bore 113 for electrically isolating the roll sections 108 and 110 from the axle extending between the bearing blocks 102. It is, of course, fully contemplated that where desirable the roll 32 may be of a split construction similar to the aforedescribed construction of the roll 30, incorporating insulation barracks but omitting the washer-like sections 114 and 115.

In order to maintain proper positioning of the fin 108 within the seam, it is desirable that the position of the roll 30 relative to the motions opposed roll 32 be selectively adjustable to that end, the bearing blocks 102 of the roll 30 are releasably secured to the U-shaped insert 98 as by elongated stud fasteners 120 extending through the legs of the insert and threaded into the bearing blocks. A travelling screw member 122 threaded through the cross bar 93 is suitable connected at its lower end to a coupling member 123 affixed to the U-shaped insert 98. The travelling screw member is suitable releasedly connected to the coupling member and adapted to rotate relative thereto. A hand wheel 124 is provided whereby the travelling screw member can be suitable turned so as to advance through the excess bar and selectively raise or lower the bearing blocks 102 and hence the roll 30. The roll assembly 30 may thus be relatively quickly removed and replaced by first disconnecting the screw member 122 from the coupling member 123 and removing the fasteners 120. Removal and replacement then proceeds as with the roll 32.

As will be apparent the rolls 30 and 32 of the rotary seam guide unit 29 may thus be readily repositioned in response to observed deviation of the alignment of the seam with the welder without interrupting production. The rolls may be moved toward or away from the inductive heating unit as desired by appropriate manipulation of the hand wheel 50. They may likewise be raised or lowered as a unit to center the tube within the induction heating unit by manipulating the hand wheel 68. The tube may be rotated about its longitudinal axis to assure proper positioning of the seam within the roller press 23 by appropriate manipulation of the hand wheel 84 to reposition the rotary bracket 73. The roll 30 may be moved toward or away from the roll 32 to properly position the annular fin 108 within the seam of the tube by means of the hand wheel 124.

It is to be understood that the forms of the invention herewith shown and described are to be taken as illustrative embodiments only of the same, and that various changes in the shape, size and arrangement of parts may be resorted to without departing from the spirit of the invention.

What is claimed is:

1. Apparatus for aligning and guiding the seam of a tube as it enters the welder in the production of continuous seam-welded metal tubing comprising, a base plate, an upstanding framework mounted upon said base plate, a carrier plate member carried within the upstanding framework and adapted for movement therein toward and away from the base plate, box frame means mounted upon the carrier plate and adapted for rotation thereon to selected angular positions, opposed first and second rolls mounted for rotation within the box frame means, the peripheral circumferential surfaces of the first and second rolls defining therebetween a pass generally conforming to the outline of the tube, the first roll including an annular fin adapted for rolling reception in the seam as the tube is directed through said pass, and means for selectively moving said first roll toward and away from said second roll to selected positions within said box frame.

2. Apparatus for aligning and guiding the seam as claimed in claim 1, wherein said base plate is mounted for movement longitudinally along the path of the tube, and including means for moving said base plate back and forth to selected longitudinal positions.

3. Apparatus for aligning and guiding the seam as claimed in claim 2, wherein said base plate is mounted for reciprocating movement upon a support platform, and said means for moving includes an elongated rack member affixed to said platform and a pinion gear mounted upon said base plate for rotation in driving engagement with said rack.

4. Apparatus for aligning and guiding the seam as claimed in claim 3, including a spaced pair of longitudinally extending guide bars affixed to said platform along either side of said base plate, said base plate being slidingly supported upon said platform, and a retainer plate affixed to each said guide bar and extending over the top marginal edge of said base plate whereby said guide bars are retainer plates confine said base plate to linear sliding movement along said platform.

5. Apparatus for aligning and guiding the seam as claimed in claim 1, wherein said upstanding framework includes a spaced pair of upright column members interconnected at their upper ends by a cross member, said columns including extending opposed recesses the opposite marginal edges of said carrier plate being slidably received in said opposed recesses whereby said carrier plate is adapted for vertical sliding movement within said framework, and adjusting means connecting said carrier plate to said cross member for adjustably moving said carrier plate to selected positions within said upstanding framework.

6. Apparatus for aligning and guiding the seam as claimed in claim 1, including a circular opening within said carrier plate member, bracket member rotatably mounted within said circular opening, and means for rotating said bracket member to selected positions relative to said carrier plate, said box frame means being affixed to said rotatably mounted bracket member.

7. Apparatus for aligning and guiding the seam as claimed in claim 6, wherein said bracket member comprises a mounting plate for bearing against one major surface of said carrier plate and including an annular flange within said circular opening, a retaining ring for bearing against the other major surface of said carrier plate around said circular opening and having a central opening corresponding to the opening in said annular flange, and means securing said retaining ring to said annular flange.

8. Apparatus for aligning and guiding the seam as claimed in claim 7, wherein said retainer ring includes a circular peripheral portion having a toothed segment, a spur gear mounted upon said carrier plate in driving engagement with said toothed segment, means for turning said spur gear to in turn rotate said bracket member, and means for releasably clamping said rotary bracket to said carrier plate in selected angular positions.

9. Apparatus for aligning and guiding the seam as claimed in claim 1, wherein said box frame means comprises a pair of spaced upright side members defining retaining ledges along their rear edges, a base member interconnecting said side members at their lower ends and a cross bar interconnecting said side members at their upper ends, means mounting said first roll for selected vertical movement between said upright side members, means mounting said second roll beneath said first roll between said upright side members, and adjusting means connecting the means mounting said first roll to said cross bar moving said first roll to selected vertical positions.

10. Apparatus for aligning and guiding the seam as claimed in claim 1, wherein said first roll comprises a pair of mating half sections, a washer section disposed between said half sections defining said annular fin, and means securing said half-section and washer section together.

11. Apparatus for aligning and guiding the seam as claimed in claim 10, wherein said washer section includes spaced face sections and a layer of electrically insulating material disposed therebetween for impeding induction heating of said first roll.

* * * * *